Patented Apr. 1, 1952

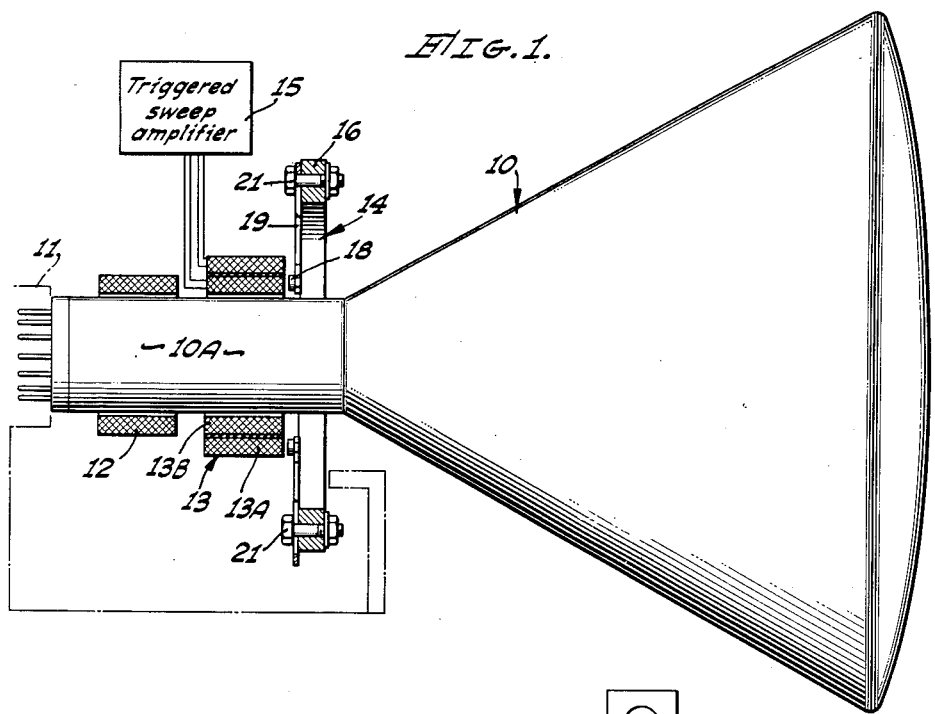
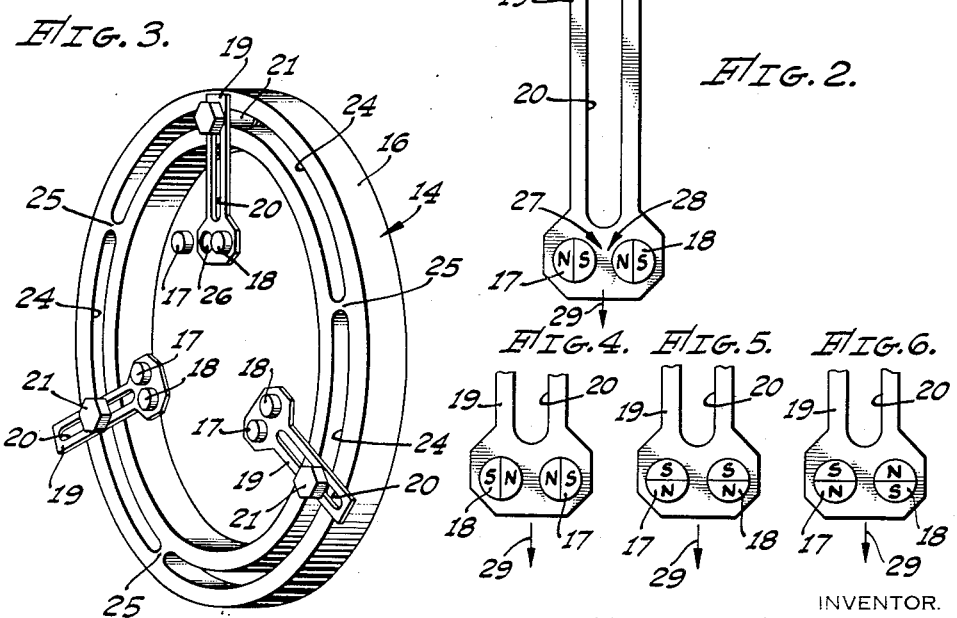

2,591,159

UNITED STATES PATENT OFFICE 2,591,159

MAGNETIC MEANS FOR PRODUCING COMPENSATIONS AND OTHER EFFECTS IN A CATHODE-RAY TUBE

Norbert G. Kabuss, Monterey Park, Calif., assignor to Gilfillan Bros., Incorporated, Los Angeles, Calif., a corporation of California Application May 29, 1950, Serial No. 165,000

12 Claims. (Cl. 313—76)

The present invention relates to a new technique and means whereby corrections or compensations may be made in the deflections of a cathode ray beam, and has general utility in all installations wherein a cathode ray tube is used.

It is desirable in radar indicating systems to provide accurate, undistorted portrayals of distances, ranges and angular positions of targets on the cathode ray tube. Oftentimes this desideratum is not obtained due, for example, to inaccurate or nonuniform spacing of the cathode, electron gun assembly or focusing means or the deflection elements, or to nonlinear conditions in the network supplying deflection voltages or currents to the cathode ray tube. Since the cathode structure and associated electron gun assembly are mounted within the tube, they are unavailable for adjustment, and for that reason the distortion, inaccuracy or nonuniformity of deflections obtained thereby must be tolerated unless some means external of the tube is used to provide a compensatory or corrective effect. Such compensatory or corrective effect may be produced to a limited degree by positioning of an external focusing coil or magnetic ring, or in selectively orienting the external magnetic deflection coil where magnetic deflection is used. While some compensatory or corrective effects may be thus obtained, they are not sufficient or critical or their effect may not be satisfactorily controlled.

While the present technique and means finds particular applicability and usefulness in radar apparatus, particularly in plan position indicators (PPI), and expanded plan position indicators as used in the precision section of (GCA) ground controlled approach aircraft landing systems, it is readily evident from the following description that the present invention may find applicability and usefulness in all installations wherein a cathode ray tube is used, such as, for example, in cathode ray oscilloscopes, television receivers, pan adaptors and other similar equipment.

In the use of radar indicators, it is common practice to provide transparent maps adapted to overlie the viewing screen of a cathode ray tube. Such maps have indicia thereon which represent certain data. However, it has been observed that each replaceable tube in a group of cathode ray tubes does not have the same deflection factor, and in the case of a twelve-inch tube the electrical center of a particular one of the group may lie anywhere within a two-inch circle. These differences between tubes result, of course, from manufacturing and assembling inaccuracies, and cause misalignment between the data on the map and the indications produced when the different tubes are connected with the same apparatus.

It is therefore an object of the present invention to provide an improved technique and means whereby a compensatory or corrective effect may be imparted in a simple, easily controlled manner to the deflection of a cathode ray beam to eliminate distortion, nonuniformity in deflection and the like.

Another object of the present invention is to provide an improved technique and means which are readily adapted to existing and new installations without affecting the positioning or arrangement of the other beam deflecting means normally associated with the cathode ray tube.

Another object of the present invention is to provide an improved technique and means of this character which may be utilized alike either with cathode ray tubes employing electromagnetic or electrostatic deflection.

Still another object of the present invention is to provide an improved technique and means whereby the so-called deflection factor, i. e., the ratio of the actual deflection of the beam to the magnitude of current or voltage producing such deflection, may be altered to such an extent as to render the value of such factor substantially independent of the amplitude of the deflection.

Stated in still further words, a further object of the present invention is to provide a technique and means whereby the deflection factor of a cathode ray tube may be altered to compensate or correct for nonlinear conditions which exist not only in the cathode ray deflection system but also in the associated electrical networks, the output voltage or current of which is applied to the deflection system to produce deflections of a cathode ray beam.

A further object of the present invention is to provide an improved technique and means which readily adapts itself for use with existing cathode ray tubes to correct or compensate for deflections of the cathode ray tube due to the earth's magnetic field or extraneous magnetic fields.

A further object of the present invention is to provide an improved technique and means whereby a cathode ray beam may be deflected to a position corresponding to the geometrical center of the viewing screen in those cases where, due to mechanical inaccuracies, the electron gun is not positioned correctly to achieve this result itself.

A further object of the present invention is to provide an improved technique and means whereby the deflections produced by a particular cathode ray tube may be conformed with data on a transparent map overlying the viewing face of the cathode ray tube.

Still a further object of the present invention is to provide an improved technique and means whereby the deflections produced by a particular cathode ray tube may be adjusted to produce compensatory effects not only for mechanical idiosyncracies in the tube structure but also for nonlinear conditions in the circuits supplying deflection voltages and currents to the tube.

Briefly, the physical embodiment of the invention described herein utilizes a plurality of pairs of small permanent magnets which are adjustably supported on a ring structure which is adapted to encircle the neck of a cathode ray tube, adjacent a region the electrons pass after being deflected by the normal deflecting means either of the electromagnetic or electrostatic type.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of a cathode ray tube with the circumscribing focusing means, deflection means and structure embodying the present invention shown in section and with the quadraturely disposed electromagnetic deflection coils connected to corresponding output terminals of the associated apparatus, Figure 2 is a view in elevation of one of the adjustably positioned magnetic supporting members used in the apparatus shown in Figures 1 and 3 and embodying features of the present invention, Figure 3 is a view in perspective of the compensating and correcting means shown in Figure 1 embodying features of the present invention, it being noted that one of the magnets in the upper pair of magnets in Figure 3 is detached from its supporting member to indicate relative dimensions of the magnet and the manner in which it is secured to the supporting member, and Figures 4, 5 and 6 show other positions the magnets 17, 18 of Figure 2 may assume to control the resultant force produced thereby.

In Figure 1 the cathode ray tube 10 has its connecting prongs inserted in the tube base 11, with focusing means 12, deflection means 13 and the compensating or correcting means 14 all circumscribing the neck portion 10A of the tube 10.

The focusing means 12 may comprise, as is conventional, either a magnetic coil or a ring-shaped permanent magnet structure.

The deflection means 13 may, as is conventional, be electromagnetic or electrostatic in character, and, as specifically illustrated in Figure 1, comprises a pair of coils 13A, 13B arranged to produce corresponding magnetic fields which act in quadrature with one another, the input terminals of the coils 13A, 13B being connected to corresponding output terminals of a triggered sweep amplifier 15, such as is found in the so-called precision section of GCA equipment as exemplified in the copending patent application of Homer G. Tasker, et al., Serial No. 680,604, filed July 1, 1946, and assigned to the same assignee as the present application.

Likewise, this triggered sweep amplifier 15 may comprise the conventional sweep circuits found in present day oscilloscopes or the so-called horizontal and vertical sweep circuits found in present day television receivers.

As mentioned previously, the deflection means 13 may be electrostatic in character, and in such case the two pairs of deflecting plates, disposed in quadrature, are, in conventional manner, disposed inside the tube with connections made thereto through the prongs or tube body.

It is thus understood that the present invention finds applicability both with tubes utilizing electromagnetic or electrostatic deflecting means.

The correcting or compensating means 14 comprises a ring-shaped member 16 with pairs of magnets 17, 18 on supports 19 adjustably positioned on the ring member 16. Such adjustment is obtained by providing each of the supporting members with an adjustment slot 20 through which a fastening bolt 21 passes. Such fastening bolt 21, in turn, passes through a corresponding one of arcuate adjustment slots 24 in the ring member. These adjustment slots 24, as shown, preferably are of equal length and extend slightly less than 120° along the periphery of the ring to provide dividing walls 25 to confine each of the supporting members 19 to a definite range of adjustment.

The pair of magnets 17, 18 may be secured to the member 19 by cementing the same in a slightly oversize recess 26 (Figure 3).

This pair of magnets 17, 18 may be cylindrical and have their magnetic poles disposed as indicated in Figure 2, so that the magnetism produced by one does not counteract appreciably the magnetism produced by the other. It is observed that these magnets 17, 18 have their poles so disposed that the magnetism is greatest in the plane of the supporting member 19, which may be of sheet stock and preferably of non-magnetic material. It is apparent that the resultant magnetic field produced by the magnets 17, 18 may be represented by the vector 29.

While the intensity of the combined magnetic field produced by the magnets 17, 18 varies with the distance from such magnets 17, 18, the maximum magnetic force is produced in the space between the magnets 17, 18, the force being represented by the vector 29 which is greatest in the plane of the supporting member 19. Thus, the combined effect of the magnets 17, 18 is essentially to provide a concentrated magnetic force whereby slight movement of the supporting member 19 may result in relatively large changes on the force exerted by such magnetic changes on a neighboring electron stream.

It is observed further that the intensity of the combined magnetic force 29 may be controlled by positioning the magnets 17, 18 in different relative positions as indicated in Figures 4, 5 and 6, and, in fact, when the magnets are disposed as in Figure 6 the combined magnetic force produced thereby is essentially zero.

Preferably, as shown in Figure 1, the assembly 14 is mounted in a position wherein the concentrated fields produced by each of the magnet pairs 17, 18 act on the neighboring electron stream traveling longitudinally of the tube, after such stream has been deflected by the deflecting means 13, since it has been observed that better control may thus be obtained, although in some installations it may be desirable to place the correcting and compensating means on the other side of the deflecting means 13, whereby the concentrated fields from each of the magnet pairs 17, 18 may act to deflect the electron beam before it is acted upon by the deflecting means 13.

While the magnet structure is preferably positioned as shown in the drawings, it is evident that the magnet structure may be placed generally anywhere along the length of the cathode ray tube, and, in fact, may be placed in front of the face of the cathode ray tube in some instances to produce compensating effects.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In combination, a cathode ray tube having associated therewith quadraturely acting beam deflecting means to deflect the cathode ray beam in said tube, and a plurality of adjustably supported magnet pairs, said magnet pairs being supported for movement as a unit and interacting with each other to produce a concentrated resultant magnetic field which acts on said beam, and means adjustably supporting said magnet pairs to act upon the cathode ray beam after it has initially been acted upon by said beam deflecting means with the axis of magnetization of one magnet of a pair being fixed in position with respect to the axis of magnetization of the other magnet of the same pair.

2. In combination, a cathode ray tube having beam deflecting means arranged to deflect the associated cathode ray beam along two mutually perpendicular directions, and a magnetic structure comprising a plurality of pairs of magnets disposed adjacent the cathode ray beam to provide a correction or compensation for the effects produced by said beam deflecting means, said magnet pairs being movable as a unit and interacting with each other to produce a concentrated resultant magnetic field which acts on said cathode ray tube.

3. In combination, a ring-shaped structure adapted to encircle a cathode ray tube, said ring-shaped structure having a motion limiting slot therein, a magnet supporting member having a motion limiting slot extending therethrough, releasable fastening means passing through the motion limiting slot in the magnet supporting member and said motion limiting slot in said ring-shaped structure, and a pair of permanent magnets mounted in spaced relationship near the end of said magnet supporting member and interacting with each other to produce a concentrated resultant magnetic field.

4. The arrangement set forth in claim 3 in which said ring-shaped structure encircles the neck portion of said cathode ray tube, and said pair of permanent magnets being disposed adjacent said neck portion.

5. In combination, a cathode ray tube having beam deflecting means arranged to deflect the associated cathode ray beam along two mutually perpendicular directions, a ring-shaped structure encircling said cathode ray tube and having a plurality of motion limiting slots extending circumferentially therein, a plurality of magnet supporting members each having a motion limiting slot extending longitudinally thereof, releasable means passing through a motion limiting slot of one of said magnet supporting members and the motion limiting slot of said ring-shaped structure, and a pair of permanent magnets mounted in spaced relationship near the end of each of said magnet supporting members to provide a correction or compensation for the effects produced by said beam deflecting means, said pair of magnets being movable as a unit and interacting with each other to produce a concentrated resultant magnetic field which acts on said cathode ray tube.

6. The arrangement set forth in claim 5 in which said ring-shaped structure encircles the neck portion of said cathode ray tube and said pair of permanent magnets are positioned thereby adjacent said neck portion.

7. In apparatus of the character described for providing corrections or compensations in the deflection of a cathode ray beam associated with a cathode ray tube, the improvement which resides in providing a plurality of magnet pairs circumferentially spaced around the tube, each magnet pair producing a concentrated resultant magnetic field which acts on said beam, with each magnet pair being movable as a unit.

8. The improvement set forth in claim 7 in which said magnet pair is mounted on an elongated supporting member, said elongated supporting member having a lost motion slot extending longitudinally therein, and said magnet pair being mounted near one end of said supporting member.

9. The improvement set forth in claim 7 in which said magnet pair is mounted on a supporting member, said supporting member incorporating means whereby the same may be positioned in different adjusted positions, said supporting member having mounted thereon near one of its ends said magnet pair.

10. In a system of the character described, a cathode ray tube having means for generating a luminous spot, means for applying a signal to said cathode ray tube for deflecting said luminous spot, said luminous spot while being deflected being subject to idiosyncrasies of said signal and the mechanical structure of said tube, and an adjustable magnetic means for establishing a magnetic field, said magnetic means comprising a plurality of pair of magnets, each pair being mounted for movement as a unit and with respect to a second of said plurality of pair of magnets and with corresponding magnets in a particular pair interacting with each other to produce a concentrated resultant magnetic field through said cathode ray tube, the orientation and configuration of said concentrated resultant field being arranged whereby in combination with said signal, said concentrated field provides a substantially corrected deflection of said luminous spot.

11. In combination, a cathode ray tube having a neck portion, cathode beam deflecting means arranged to deflect the associated cathode ray beam along two mutually perpendicular directions, said beam deflecting means being disposed adjacent said neck portion, a plurality of magnet pair a structure supporting each of said magnet pair adjacent said neck portion, each of said magnet pair being movable as a unit and with respect to a second of said plurality of magnet pair and with corresponding magnets in a particular pair interacting with each other and producing a concentrated resultant magnetic field which acts on the cathode beam jointly with said beam deflecting means.

12. In combination, a cathode ray tube having a neck portion, electro-magnetic deflecting means positioned adjacent said neck portion to deflect the associated cathode beam along two mutually perpendicular directions, means supporting a plurality of pair of permanent magnets adjacent said neck portion, said supporting means including means for maintaining each of said pair of permanent magnets in fixed spaced relationship with the magnetism from each permanent magnet in a pair interacting with the other in the same pair to produce a concentrated or focussed resultant magnetic field which is effective to cause deflection of the cathode ray beam without producing substantial secondary effects on the field produced by said electro-magnetic deflecting means, and said supporting means including means whereby one of said pair of magnets may be adjusted as a unit in relationship to a second of said pair of magnets.

NORBERT G. KABUSS.

REFERENCES CITED

The following references are of record in the file of this patent:

UNITED STATES PATENTS

| Number | Name | Date |
| --- | --- | --- |
| 2,157,182 | Maloff | May 9, 1932 |
| 2,177,688 | Cawein | Oct. 31, 1939 |
| 2,258,643 | DeGier et al. | Oct. 14, 1941 |
| 2,455,977 | Bocciarelli | Dec. 14, 1948 |
| 2,459,732 | Bradley | Jan. 18, 1949 |
| 2,499,065 | Heppner | Feb. 28, 1950 |
| 2,541,446 | Trott | Feb. 13, 1951 |